US008201016B2

(12) United States Patent
Pattabhiraman et al.

(10) Patent No.: US 8,201,016 B2
(45) Date of Patent: Jun. 12, 2012

(54) HEARTBEAT DISTRIBUTION THAT FACILITATES RECOVERY IN THE EVENT OF A SERVER FAILURE DURING A USER DIALOG

(75) Inventors: Ramesh V. Pattabhiraman, New Albany, OH (US); Kumar V. Vemuri, Naperville, IL (US)

(73) Assignee: Alcatel Lucent, Paris (FR)

( * ) Notice: Subject to any disclaimer, the term of this patent is extended or adjusted under 35 U.S.C. 154(b) by 635 days.

(21) Appl. No.: 11/823,672

(22) Filed: Jun. 28, 2007

(65) Prior Publication Data
US 2009/0006885 A1 Jan. 1, 2009

(51) Int. Cl.
*G06F 11/00* (2006.01)
(52) U.S. Cl. ............... 714/4.1; 714/4.2; 714/25; 714/31; 714/49
(58) Field of Classification Search ............... 714/4, 4.2, 714/49, 4.1, 25, 31
See application file for complete search history.

(56) References Cited

U.S. PATENT DOCUMENTS

| | | | | |
|---|---|---|---|---|
| 6,138,249 | A * | 10/2000 | Nolet | 714/25 |
| 6,609,213 | B1 * | 8/2003 | Nguyen et al. | 714/4 |
| 6,728,896 | B1 * | 4/2004 | Forbes et al. | 714/4 |
| 6,782,496 | B2 * | 8/2004 | Fleming | 714/55 |
| 6,883,065 | B1 * | 4/2005 | Pittelkow et al. | 711/114 |
| 7,162,666 | B2 * | 1/2007 | Bono | 714/51 |
| 7,302,370 | B2 * | 11/2007 | Nickerson et al. | 703/6 |
| 7,370,064 | B2 * | 5/2008 | Yousefi'zadeh | 707/200 |
| 7,389,300 | B1 * | 6/2008 | Shah et al. | 1/1 |
| 7,549,079 | B2 * | 6/2009 | Connolly et al. | 714/6.1 |
| 7,617,525 | B1 * | 11/2009 | Moeck et al. | 726/11 |
| 7,661,027 | B2 * | 2/2010 | Langen et al. | 714/15 |
| 7,725,764 | B2 * | 5/2010 | Morosan et al. | 714/4.12 |
| 7,797,565 | B1 * | 9/2010 | Tran et al. | 714/4.1 |
| 7,941,544 | B2 * | 5/2011 | Hayer et al. | 709/227 |
| 2002/0049845 | A1 * | 4/2002 | Sreenivasan et al. | 709/226 |
| 2002/0188753 | A1 * | 12/2002 | Tang et al. | 709/237 |
| 2004/0122961 | A1 * | 6/2004 | Rouault | 709/229 |
| 2005/0086347 | A1 * | 4/2005 | Deen et al. | 709/229 |
| 2005/0102676 | A1 * | 5/2005 | Forrester | 718/105 |

(Continued)

*Primary Examiner* — Scott Baderman
*Assistant Examiner* — Loan L. T. Truong
(74) *Attorney, Agent, or Firm* — Carmen Patti Law Group, LLC

(57) ABSTRACT

An exemplary method facilitates automatic recovery upon failure of a server in a network responsible for replying to user requests. Periodic heartbeat information is generated by a first group of servers responsible for replying to user requests. The heartbeat information provides an indication of the current operational functionality of the first group of servers. A second group of servers determines that one of the first servers has failed based on the periodic heartbeat information. The second group of servers is disposed in communication channels between users and the first group of servers. One of the second group of servers receives a message containing a request from a first user having the one of the first group of servers as a destination. One of the second group of servers determines that the message is part of an ongoing dialog of messages between the first user and the one of the first group of servers. Stored dialog information contained in previous communications between the first user and the one of the first group of servers associated with the ongoing dialog is retrieved. Another message is transmitted from the one of the second group of servers to another of the first group of servers. The another message includes the request contained in the message and the retrieved dialog information. This enables the another server to process the request based on the retrieved dialog information without requiring the first user to have to retransmit previously transmitted information that was part of the dialog information.

5 Claims, 3 Drawing Sheets

U.S. PATENT DOCUMENTS

| | | | | |
|---|---|---|---|---|
| 2005/0114480 | A1* | 5/2005 | Ramamoorthy | 709/220 |
| 2005/0267904 | A1* | 12/2005 | Yako et al. | 707/100 |
| 2005/0268156 | A1* | 12/2005 | Mashayekhi et al. | 714/4 |
| 2006/0041660 | A1* | 2/2006 | Bishop et al. | 709/224 |
| 2006/0047836 | A1* | 3/2006 | Rao et al. | 709/229 |
| 2006/0100981 | A1* | 5/2006 | Jones et al. | 707/1 |
| 2006/0107284 | A1* | 5/2006 | Crawford et al. | 725/25 |
| 2006/0112297 | A1* | 5/2006 | Davidson | 714/2 |
| 2006/0129872 | A1* | 6/2006 | Fung et al. | 714/4 |
| 2006/0130132 | A1* | 6/2006 | Dharmarajan | 726/10 |
| 2006/0143495 | A1* | 6/2006 | Bozak et al. | 714/4 |
| 2006/0164974 | A1* | 7/2006 | Ramalho et al. | 370/219 |
| 2006/0168334 | A1* | 7/2006 | Potti et al. | 709/239 |
| 2006/0190602 | A1* | 8/2006 | Canali et al. | 709/226 |
| 2006/0253727 | A1* | 11/2006 | Leveille et al. | 714/4 |
| 2006/0271813 | A1* | 11/2006 | Horton et al. | 714/4 |
| 2006/0274761 | A1* | 12/2006 | Error et al. | 370/396 |
| 2006/0277596 | A1* | 12/2006 | Calvert et al. | 726/3 |
| 2007/0027896 | A1* | 2/2007 | Newport et al. | 707/102 |
| 2007/0043860 | A1* | 2/2007 | Pabari | 709/224 |
| 2007/0061329 | A1* | 3/2007 | Moutafov | 707/10 |
| 2007/0067663 | A1* | 3/2007 | Surasinghe | 714/4 |
| 2007/0088972 | A1* | 4/2007 | Srivastava et al. | 714/4 |
| 2007/0112966 | A1* | 5/2007 | Eftis et al. | 709/227 |
| 2007/0147306 | A1* | 6/2007 | Halpern | 370/331 |
| 2007/0174660 | A1* | 7/2007 | Peddada | 714/4 |
| 2007/0180077 | A1* | 8/2007 | Letca et al. | 709/223 |
| 2007/0192326 | A1* | 8/2007 | Angal et al. | 707/10 |
| 2007/0220302 | A1* | 9/2007 | Cline et al. | 714/4 |
| 2007/0226214 | A1* | 9/2007 | Smits | 707/7 |
| 2007/0245167 | A1* | 10/2007 | De La Cruz et al. | 714/4 |
| 2007/0286087 | A1* | 12/2007 | Compton et al. | 370/242 |
| 2008/0040484 | A1* | 2/2008 | Yardley | 709/227 |
| 2008/0137531 | A1* | 6/2008 | Tal-Aviv et al. | 370/221 |
| 2008/0270709 | A1* | 10/2008 | Smits et al. | 711/147 |
| 2010/0318610 | A1* | 12/2010 | Hisgen et al. | 709/205 |

* cited by examiner

HEARTBEAT DISTRIBUTION THAT FACILITATES RECOVERY IN THE EVENT OF A SERVER FAILURE DURING A USER DIALOG

BACKGROUND

This invention relates to monitoring the health of a cluster of servers that provide services to users. More specifically, this invention relates to using such health information to facilitate a recovery during a user dialog with a server in view of a failure of the server which had been supporting the dialog.

Heartbeats have been typically utilized by a single monitoring node to determine the health of other nodes in the network. The single monitoring node may periodically transmit inquiries to each of the nodes being monitored with the expectation of receiving a reply from each within a known time to confirm the health of each node.

Detecting the failure of a node by its missing heartbeat at the monitoring node permits the latter to implement alternative actions. For example, the monitoring node may redirect future service requests directed to the failed node to another node. Such action may be sufficient where the service request represents a new initial request for service or is a stand-alone request that is independent of past history involving the failed node. However, as recognized as part of the present invention, redirecting a service request sent to a failed node to another node does not represent an effective solution where the service request is dependent on prior information stored at or exchanged with the failed node, i.e. where the prior history of communications with the failed node is required to process the current request such as in an ongoing dialog. Thus, a need exists for a better recovery technique when a service node fails, especially where a user request is dependent on past communications with the failed node.

SUMMARY

It is an object of the present invention to satisfy this need.

An exemplary method of the present invention facilitates automatic recovery upon failure of a server in a network responsible for replying to user requests. Periodic heartbeat information is generated by a first group of servers responsible for replying to user requests. The heartbeat information provides an indication of the current operational functionality of the first group of servers. A second group of servers determines that one of the first servers has failed based on the periodic heartbeat information. The second group of servers is disposed in communication channels between users and the first group of servers. One of the second group of servers receives a message containing a request from a first user having the one of the first group of servers as a destination. One of the second group of servers determines that the message is part of an ongoing dialog of messages between the first user and the one of the first group of servers. Stored dialog information contained in previous communications between the first user and the one of the first group of servers associated with the ongoing dialog is retrieved. Another message is transmitted from the one of the second group of servers to another of the first group of servers. The another message includes the request contained in the message and the retrieved dialog information. This enables the another server to process the request based on the retrieved dialog information without requiring the first user to have to retransmit previously transmitted information that was part of the dialog information.

Servers that implement the above method provide another exemplary embodiment of the present invention.

A tangible computer readable storage medium encoded with control instructions for servers provide a further exemplary embodiment of the present invention.

DESCRIPTION OF THE DRAWINGS

Features of exemplary implementations of the invention will become apparent from the description, the claims, and the accompanying drawings in which:

DETAILED DESCRIPTION

One aspect of the present invention resides in the recognition that the mere presence of heartbeats to measure the health of nodes in a network is not necessarily sufficient to efficiently handle recovery upon the occurrence of the failure of a node. This is especially apparent with recovery in a network where an ongoing dialog is begun with a serving node that fails prior to completion of the dialog. As used herein, a "dialog" refers to a series of communications with a server in which processing of one or more of the communications in the series by the server depends upon information or results associated with a prior communication in the series. For example, assume that a user desires to see a map with an area surrounding an address. The user sends the address, city and state to the server as a first part of a dialog. The server utilizes a database to identify the location and transmits a map image to the user showing the address located on the map having a default granularity. After studying the map for a time, the user desires to see the requested location on a map with greater granularity, i.e. a zoom-in of the map at the same address location. The user transmits a zoom-in request to the same server where the zoom-in request does not contain the original address information since the server already has this information. In response, the server generates another map with increased granularity based on the original location information and transmits this image to the user. This completes the services desired by the user and the dialog.

This example is illustrative of a dialog because fulfilling the zoom-in request by the server depends upon the original location information received in the prior request. If the server in this example had failed following the transmission of the original map image to the user but prior to the receipt of the zoom-in request, another server to which the zoom-in request could be redirected would not be able to properly service the request since it would not have access to the original address information upon which the zoom-in request is based. As will be explained in more detail below, an embodiment of the present invention more effectively handles a server failure to enable recovery for users while minimizing the need to seek a repeat of prior sent information of the dialog from the users.

Figure 1:
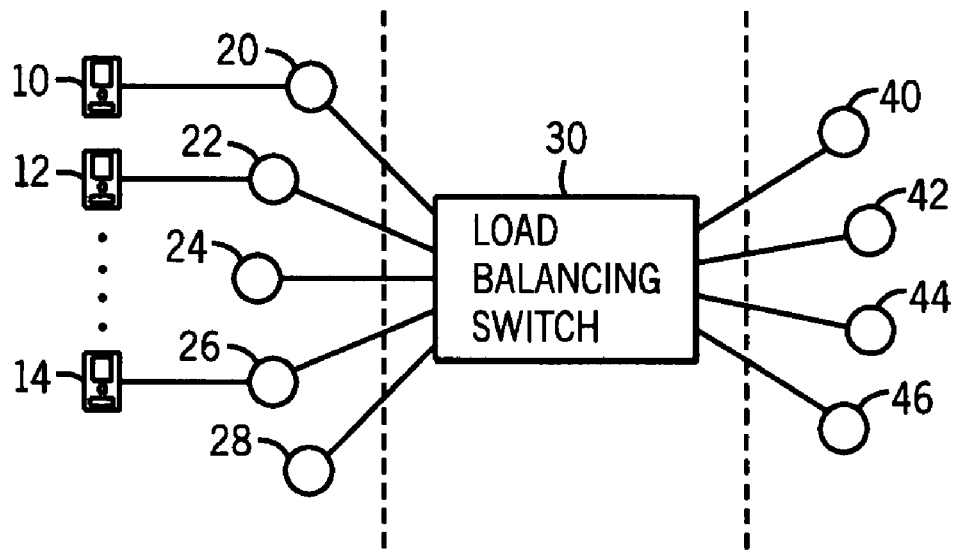
FIG. 1 is a block diagram of a network suited for incorporation of an embodiment of the present invention.

FIG. 1 shows an illustrative network that supports a plurality of users where each user is supported by communication device 10, 12 and 14. The communication devices may comprise a personal computer, personal digital assistant, cellular telephone or other type of communication device capable of two-way communications, either over a wireline connection or wirelessly. In the illustrative network, front end servers 20, 22, 24, 26 and 28 support communication services with the communication devices of the users. Each front end server is capable of supporting a plurality of users. The front end servers are coupled to a load balancing switch 30 which is also coupled to back end servers 40, 42, 44 and 46. In the illustrative network the back end servers are configured to include resources required to respond to and satisfy requests made by users. The front end servers provide general communication and routing support for the users. The load balancing switch 30 serves as a switch that defines communication channels between the front end and back end servers, and operates to distribute the total load from all users across the back end servers.

Figure 2:
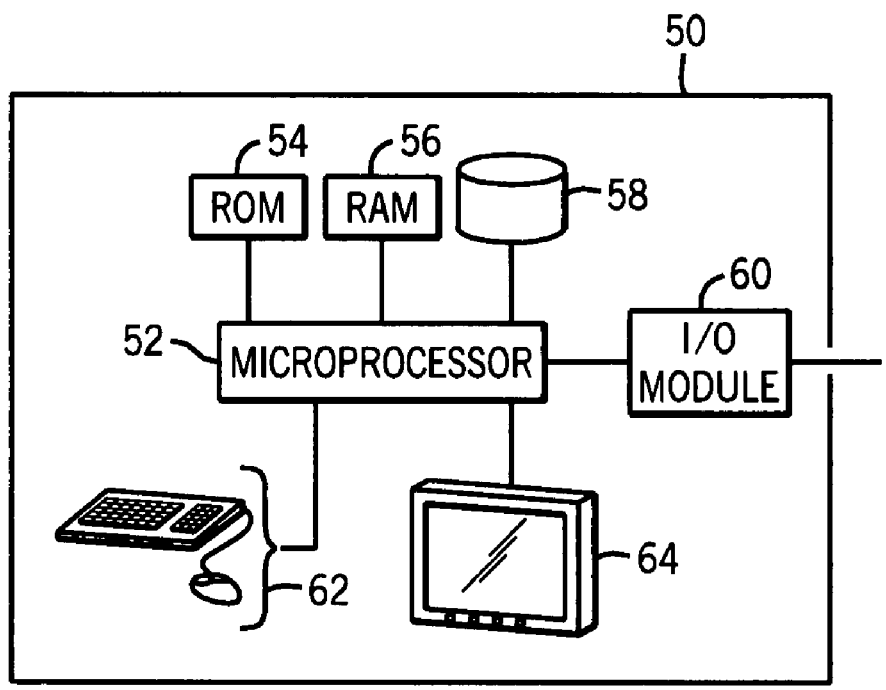
FIG. 2 is a diagram of illustrative nodes as shown in FIG. 1.

FIG. 2 is a block diagram of a node 50 such as used in the network is shown in FIG. 1. The architecture shown for node 50 could be utilized for the front end processors/servers, the load balancing switch or the back end servers. A microprocessor 52 is supported by read-only memory (ROM) 54, random access memory (RAM) 56, and nonvolatile data storage device 58 which may be a hard drive. An input/output module 60 is coupled to the microprocessor 52 and supports inbound and outbound communications with external devices. Input devices 62 such as a keyboard or mouse permit an administrator to provide data and control inputs to the microprocessor. Output generated by the microprocessor can be displayed to the administrator by an output device 64 such as a monitor. Program instructions initially stored in ROM 54 and storage device 58 are typically transferred into RAM 56 to facilitate run-time operation of the application implemented by microprocessor 52.

Each of the types, i.e. classes, of nodes in FIG. 1 has a different responsibility. The primary application implemented by the front end servers involves handling communications with the communication devices of the users. The primary application associated with the load balancing switch involves control of communication channels and routing of communications over the channels between the front end servers and the back end servers. If node 50 represents the load balancing switch 30, a channel switching unit (not shown) may also be employed to maintain selectable interconnections between channels connecting the front end servers and channels connecting the rear end servers. The primary application implemented by the rear end servers relates to processing user requests, accessing information associated with a user request, and transmitting a reply to a user request, where the reply may include information or data relevant to the request. It will be apparent to those skilled in the art that the stored program instructions in the nodes will support the respective application programs which include the implementation of the illustrative steps of an embodiment of the method in accordance with the present invention as described below.

Figure 3:
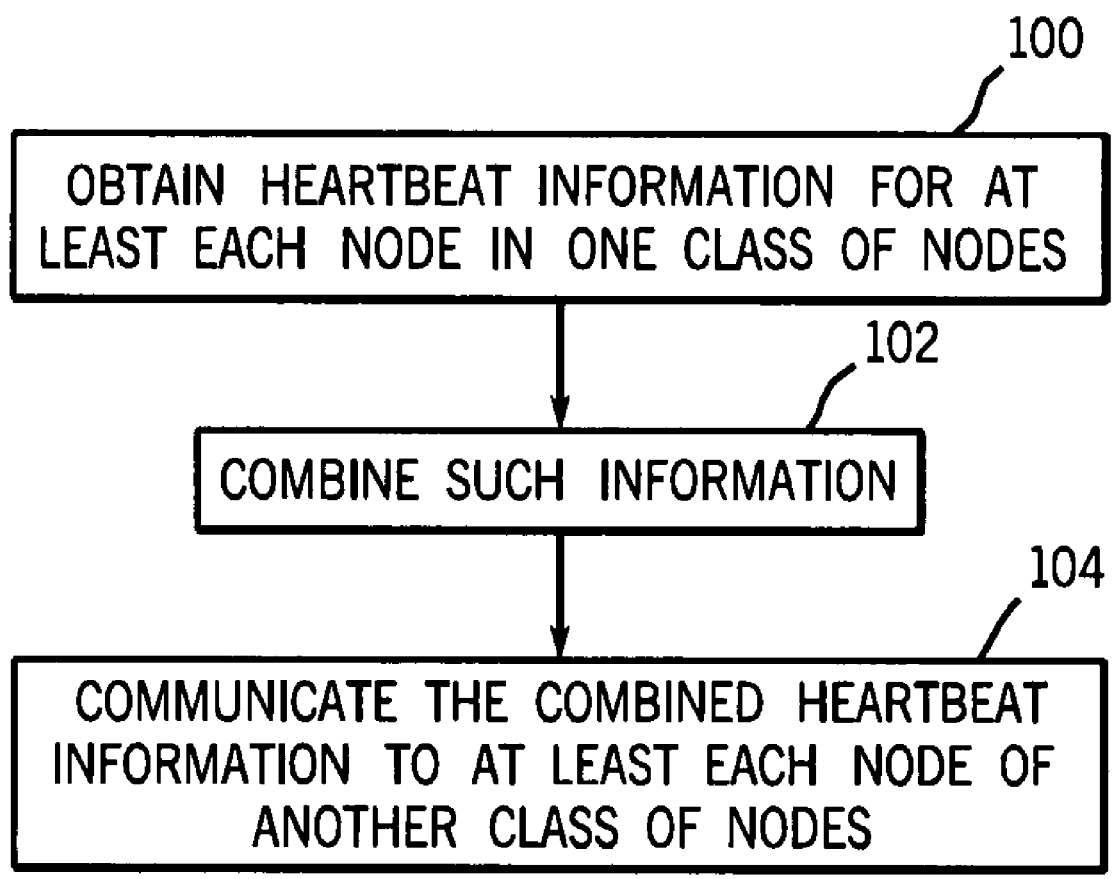
FIG. 3 is a flow diagram of illustrative steps for distributing heartbeat information in accordance with an embodiment of a method of the present invention.

FIG. 3 illustrates the generation and distribution of heartbeat information in accordance with an embodiment of a method of the present invention. In step 100 heartbeat information is obtained, such as by the load balancing switch, for at least each node in one class of nodes. At least each of one type of server, e.g. back end servers, generates a heartbeat as an indication of the health, i.e. operational functionality, of the respective nodes. This information is received by the load balancing switch. In addition to providing health information of a node, the heartbeat may also include other information such as an indication of the load of the respective node. In another embodiment, each of the server nodes of the network, e.g. the front end nodes and the back end nodes, generate heartbeat information that is collected by the load balancing switch 30.

In an alternative embodiment of the above, the load balancing switch may utilize a reliable transport to itself issue heartbeats to various nodes belonging to each class of nodes. The success or failure of the heartbeat delivery step can serve as a direct indicator of the health of the nodes that were "pinged" in each case. As used herein receiving heartbeat information includes any technique by which the heartbeat information can be obtained. Each heartbeat ping may itself contain the health information of the other class of nodes that that node might be interested in. This information could be further augmented with load information if the nodes themselves were to convey that in a periodic pulse to the load balancing switch. Since the load balancing switch starts with minimal information about the health of the nodes in the cluster but builds this knowledge up as it successfully pings more and more nodes with heartbeat reports, this process of cluster health information collection and dissemination represents a "growth spiral heartbeat mechanism".

In step 102 the heartbeat information collected by the load balancing switch is combined into a message. That is, all of the currently available heartbeat information for all nodes reporting heartbeat information is combined into one message so that the health of each can be determined based on receipt of this message. Of course, other information associated with the heartbeat information, e.g. loading of each node, will also be contained in the message.

In step 104 the heartbeat information of each of at least one class of nodes is communicated to at least each of another class of nodes by transmitting the one message to the latter. For example, the heartbeat information for each of the back end servers can be communicated by the load balancing switch by sending the message to each of the front end servers. This provides each of the front end servers with information concerning the operational status and load associated with each of the back end servers.

In another embodiment in which each of the nodes communicates heartbeat information with each of the other nodes, each node in the network will report its operational status and load information to a central collecting node which will collect this information into a message and transmit the message to each of the other nodes in the network. The heartbeats can be automatically generated on a periodic basis. Alternatively, one or more nodes in the network, e.g. a central collecting node, can be responsible for polling each of the nodes in the network for heartbeat information.

Figure 4:
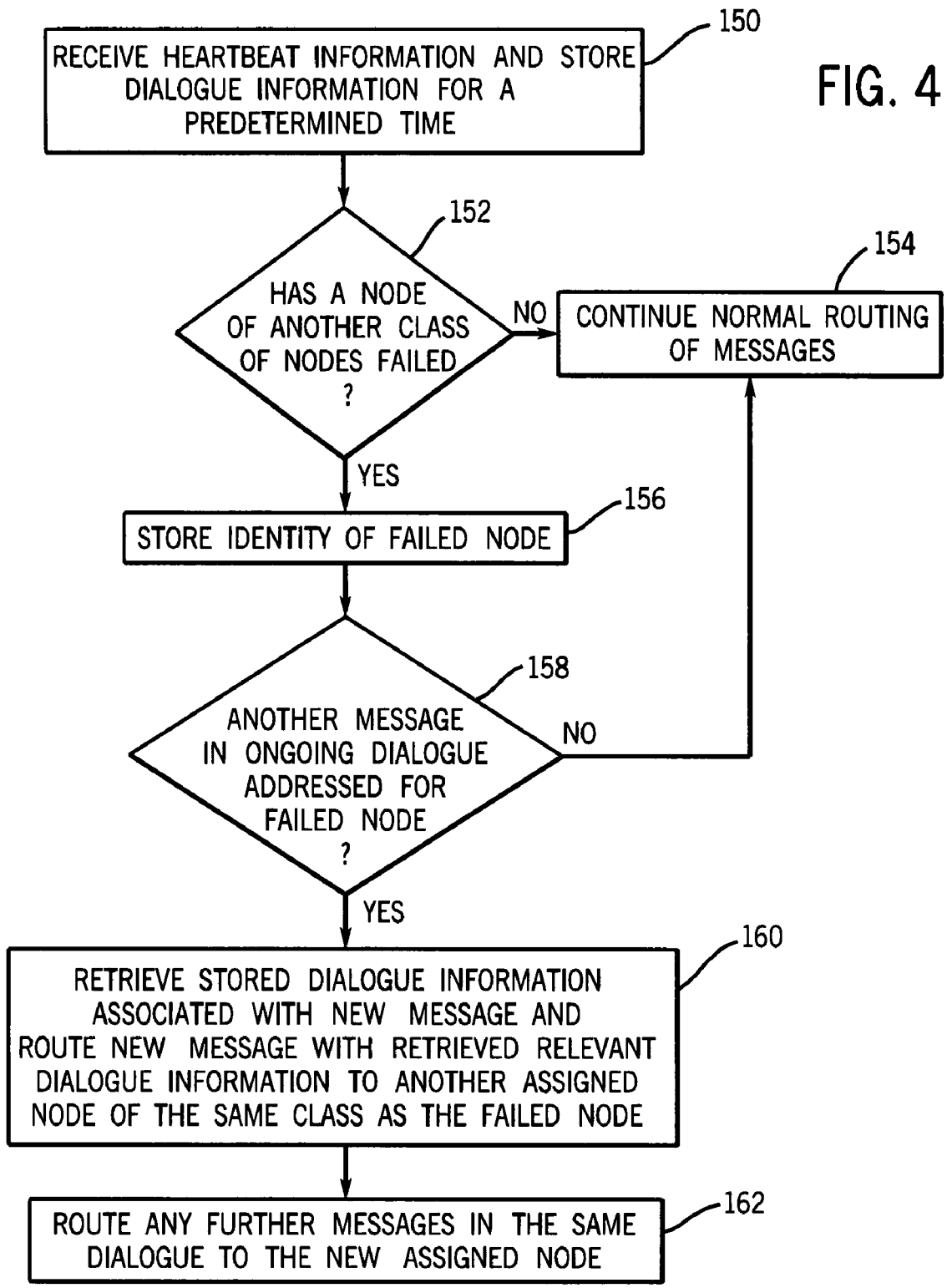
FIG. 4 is a flow diagram of illustrative steps for recovery following a node failure in accordance with an embodiment of a method of the present invention.

FIG. 4 is a flow diagram that shows exemplary steps for recovery upon the failure of a back end server in accordance with an embodiment of a method of the present invention. In this example a user is engaged in a dialog via a front end server and load balancing switch with a back end server, and the back end server experiences a failure prior to the conclusion of the dialog. In accordance with the embodiment of the present invention, a recovery is provided by which a continuance of the dialog with another back end server proceeds without requiring the user to input information previously provided earlier in the dialog. This is facilitated by the front end server handling the dialog recognizing the failure of the back end server based on the received heartbeat information.

To provide a more concrete example, assume that the user associated with communication device 12, supported by front end server 22 and load balancing switch 30, is in a dialog in which services are being supplied by back end server 42. In step 150 front end server 22 receives periodically updated heartbeat information, such as in a message from the load balancing switch containing health information for each of the back end servers. Front end server 22 may also store information associated with each dialog handled through it. For example, at the beginning of a dialog supported through front end server 22, a record can be generated in a database associated with server 22 that identifies the user's communication device 12, the back end server 42 and a dialog identification number. All information contained in communications between the user and the back end server involving this dialog that flow through the front end server 22 can be stored in this record. Assuming the communication protocol communicates an indication signifying the conclusion of the dialog, server 22 can cause the associated record to be deleted upon the end of subject dialog or after a predetermined time of inactive communications associated with the dialog. Alternatively, the dialog information may be stored elsewhere such as in the user's communication device such as in cookies. In step 152 a determination is made of whether a node of another class of nodes has failed based on received heartbeat information such as in a message from the load balancing switch. In this example, front end node 22 will periodically make determinations about the health of the back end servers based on received heartbeat information. A NO determination by step 152, indicating no failure of any of the back end servers, results in the front end server continuing to route communications normally between the user communication devices and the assigned back end servers.

In accordance with this example, the user of communication device 12 is an ongoing dialog with back end server 42 as supported by front end server 22. The ongoing dialog consists of periodic messages sent from the user to the back end server 42 with corresponding replies sent from the back end server 42 to the user. Upon an initial communication from the user to start the subject dialog, one of the back end servers is assigned by the load balancing switch 30 to handle the dialog. Subsequent communications during the dialog from the user would be routed to the same back end server.

A YES determination by step 152, representing that a node failure has been detected, causes the identity of the failed node to be stored as in step 156. In this example, front end server 22 detects the failure of back end server 42 and stores its identity as a failed node. In step 158 a determination is made of whether the front end server 22 detects the receipt of another message in an ongoing dialog addressed for the failed node. In this example, the user of communication device 12 has transmitted another communication in the ongoing dialog that had been supported by back end server 42, i.e. the user will be unaware that back end server 42 is no longer operative. A NO determination by step 158, representing that a received message from a user is not another message in an ongoing dialog series with the failed server, results in further processing at step 154, i.e. normal routing of the message to load balancing switch 30 is made by the front end server for distribution to the assigned back end server.

A YES determination by step 158, representing that the received message from a user is another message in an ongoing dialog with the failed server, results in further processing as indicated at step 160. Front end server 22 identifies this dialog and causes the stored record of information associated with the subject ongoing dialog to be retrieved. The current received message is routed along with the retrieved relevant information to another assigned node of the same class as the failed node. Alternatively, if the information may be stored elsewhere, e.g. in the user's communication device, the front end server can generate a request to the device storing the dialog information for the storage device to transmit this information to another back end server selected by the front end server that will handle the continuing dialog. Front end server 22 selects another back end server, e.g. back end server 44, to continue providing the user with services associated with the ongoing dialog previously supported by back end server 42. Because the back end server 44 will receive the current message as well as all of the information associated with the previous messages of the ongoing dialog, the back end server 44 will be able to continue to provide services to the user associated with the ongoing dialog without having to query the user for required information available from the stored dialog. In accordance with step 162, any further messages from the user in the same dialog are routed to the new assigned node. That is, further messages in the same dialog from the user associated with communication device 12 initially addressed to back end server 42 will automatically be readdressed by front end server 22 to have back end server 44 as the destination node.

In a possible alternative embodiment of the invention, the dialogs may be proactively recovered by the front-end node when a back-end node failure is detected and notified to the front-end node through heartbeats. In this scenario, the front-end node may opt not to wait till the next request from a client arrives within the established dialog context, but may proactively choose to populate state in a different back-end server for each of the dialogs it had associated with that server. This way, idle cycles on the front-end server can be utilized to perform "dialog maintenance" functions, and new incoming requests for failed dialogs do not take significantly longer to process. This represents a proactive dialog recovery.

This provides an efficient and beneficial solution to difficulties which arise with the failure of a server during an ongoing user dialog in which services are being provided by the failed server. Such a recovery from a failure of a servicing node prevents the user from being burdened to retransmit all or at least a portion of the information that had been previously transmitted to and/or handled by the failed node. This is supported by the failure of the servicing node being made known to another transporting node based on the heartbeat information. In accordance with embodiments of the present invention, an automatic recovery is accomplished where the user experiences an uninterrupted call flow for the dialog.

The nodes in one example employ one or more computer-readable signal-bearing tangible media. The computer-readable signal-bearing media store software, firmware and/or assembly language for performing one or more portions of one or more embodiments of the invention. The computer-readable signal-bearing medium for the nodes in one example comprise one or more of a magnetic, electrical, optical, biological, and atomic data storage tangible medium. For example, the computer-readable signal-bearing medium comprise floppy disks, magnetic tapes, CD-ROMs, DVD-ROMs, hard disk drives, and electronic memory.

Although exemplary implementations of the invention have been depicted and described in detail herein, it will be apparent to those skilled in the art that various modifications, additions, substitutions, and the like can be made without departing from the spirit of the invention. With regard to the illustrative steps of an embodiment of a method of the present invention, other steps can be substituted, steps deleted, and/or the steps could be practiced in a different order or by a different apparatus. Heartbeat information can be communicated by transmitting and receiving a heartbeat from each node to every other node in another class. Any node or network element through which communications from an external device such as a user's communication device will travel prior to reaching a servicing node can be utilized to reassign a different service node in the event of a failure of the service node supporting a dialog. Alternatively, one node could monitor for the failure of a servicing node while a different network element is utilized to reassign a different service node in the event of a failure. In accordance with the illustrative network, the front end servers could monitor for the failure of a back end server while the load balancing switch functions to reassign a different back end server in the event of a failure of a back end server. Because all service requests flow through the load balancing switch in the illustrative embodiment, the load balancing switch could monitor for failure of a back end server, cause a retrieval of the prior related dialog information, and reassign a different back end server in the event of a failure of a back end server with an ongoing user dialog. More than two classes of nodes can utilize the heartbeat information distribution and automatic recovery techniques described herein.

The scope of the invention is defined in the following claims.

We claim:

1. A method for providing nodes in a network with heartbeat information comprising the steps of:
   receiving periodic heartbeat information at a central node for each of a plurality of first nodes of a first type responsible for replying to user requests where the heartbeat information provides an indication of the current operational functionality of the respective first nodes;
   generating one message at the central node based on the periodic heartbeat information where the one message contains heartbeat information associated with each of the first nodes;
   transmitting from the central node the one message to each of a plurality of second nodes of a second type that differs from the first type;
   determining at each of the second nodes based on the received one message whether each of the first nodes is currently capable of providing its respective normal functionality.

2. The method of claim 1 further comprising the steps of determining at one of the second nodes that one of the first nodes is not currently capable of providing its normal functionality, and assigning by the one of the second nodes another of the first nodes to handle user requests received by the one of the second nodes designated by the user to be processed by the one of the first nodes.

3. The method of claim 1 wherein the central node comprises a load balancing switch and the method further comprises the steps of:
   receiving periodic heartbeat information at the central node for each node in the network where the heartbeat information provides an indication of the current operational functionality of the respective nodes;
   generating the one message at the central node based on the periodic heartbeat information where the one message contains heartbeat information associated with all of the nodes;
   transmitting from the central node information contained in the one message to each of the nodes;
   determining at each of the nodes based on the received information whether any other node in the network is not currently capable of providing its respective normal functionality.

4. A central node that provides nodes in a network with heartbeat information, the central node comprising:
   a microprocessor controlled apparatus that receives periodic heartbeat information for each of a plurality of first nodes of a first type responsible for replying to user requests where the heartbeat information provides an indication of the current operational functionality of the respective first nodes;
   the microprocessor controlled apparatus generates one message based on the periodic heartbeat information where the one message contains heartbeat information associated with each of the first nodes;
   the microprocessor controlled apparatus transmits the one message to each of a plurality of second nodes of a second type that differs from the first type so that second nodes can determine based on the respective heartbeat information received in the one message whether each of the first nodes is currently capable of providing its respective normal functionality.

5. The central node of claim 4 wherein the central node comprises a load balancing switch.

* * * * *